March 26, 1935.  W. A. BRUSH  1,995,834
BRAKE CONTROL
Original Filed Oct. 5, 1929   2 Sheets-Sheet 1
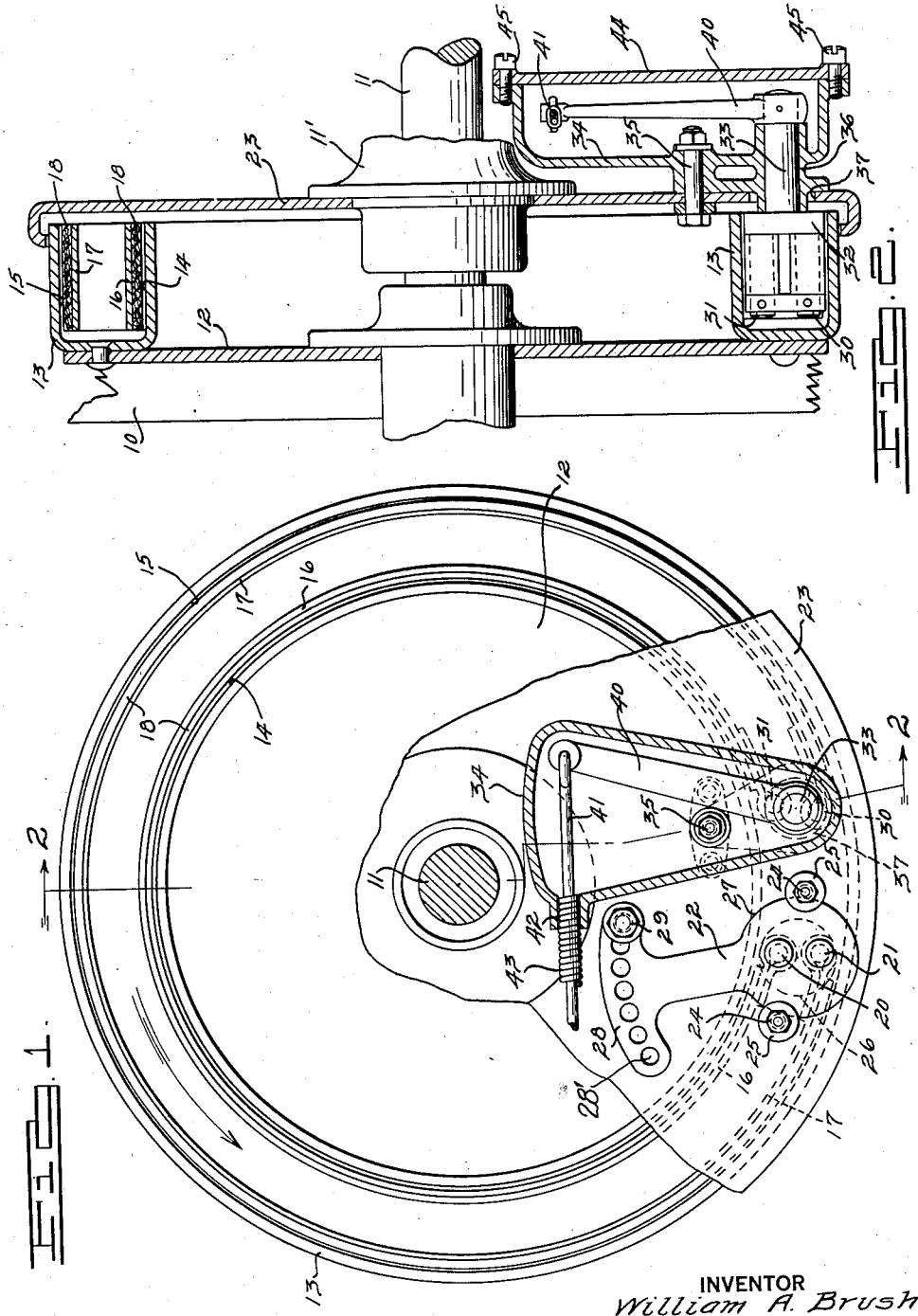
INVENTOR
William A. Brush.
BY
ATTORNEYS.

March 26, 1935.   W. A. BRUSH   1,995,834
BRAKE CONTROL
Original Filed Oct. 5, 1929   2 Sheets-Sheet 2
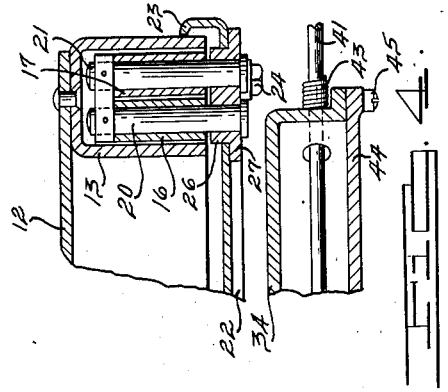
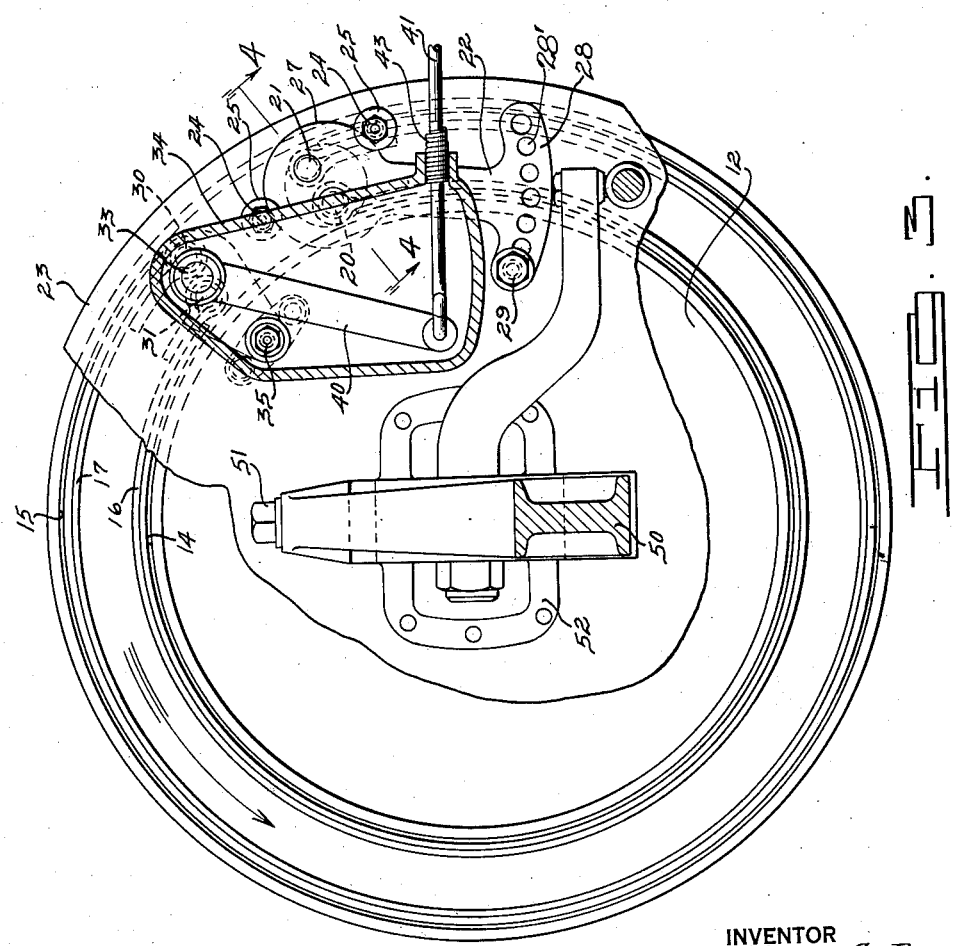
INVENTOR
William A. Brush
BY
Harness, Dickey, Pierce & Haun
ATTORNEYS.

Patented Mar. 26, 1935

1,995,834

UNITED STATES PATENT OFFICE 1,995,834

BRAKE CONTROL

William A. Brush, Detroit, Mich.

Original application October 5, 1929, Serial No. 397,488. Divided and this application April 20, 1931, Serial No. 531,499

21 Claims. (Cl. 188—74)

The invention relates to brakes and it has particular relation to brakes used in conjunction with the wheels of motor vehicles.

The invention constitutes an improvement over the mechanism embodied in my application for patent Serial Number 379,488, relating to brakes, which was filed October 5, 1929.

The principal objects of the invention are to provide a novel and highly efficient brake mechanism in which the operating parts are located in housings that protect them from dirt and other foreign matter that ordinarily get into the working parts of a mechanism of this general character; to provide a housing means for protecting the working parts particularly of a brake mechanism such as disclosed in my above identified application for patent in which contracting and expanding brake bands are both operated by equalizing, manipulating means, and to provide a protecting housing of this character which is so mounted that it also constitutes a means for equalizing the action of the brake mechanism.

At the present time, the construction of brakes for motor vehicles is of the utmost importance because it largely controls the safety with which motor vehicles may be operated. The operating parts of the brake mechanism, therefore, should be protected from dirt and other foreign matter which seriously impair the efficiency of brake operation. The particular brake mechanism here disclosed comprises radially spaced brake drums, a contractible brake band extending around the periphery of the inner brake drum, and an expansible brake band extending about the inner periphery of the outer drum. The bands are anchored at one end to a non-rotatable anchoring part, serving as a closure for the drums, while the other ends of the bands are secured to an operating member which, in turn, is pivotally mounted for equalizing purposes. The operating member extends to the exterior of the brake housing and into an auxiliary housing serving as a pivotal support therefor, and which auxiliary housing is pivoted on the non-rotatable part. An arm interiorly of the second housing is connected to the operating part and serves initially to move the bands into approximately their operative position. An operating element extending through the auxiliary housing and connected to the arm is connected to a brake pedal, for example, by means of which the brakes may be actuated. After the initial movement of the brake bands as stated above, the auxiliary housing automatically moves about its pivot to the extent necessary for equalization of the brake band action. Hence, it is apparent that the brake band, braking surfaces of the drum, and the brake operating means are located in two housings one of which is pivoted to the other and which constitutes a part of the equalizing means. Hence, all the brake parts are protected from dirt, moisture and so forth, while at the same time, a very efficient arrangement is provided.

For a better understanding of the invention, reference may be had to the accompanying drawings wherein—

Fig. 1 is a fragmentary elevational view of a rear wheel of a motor vehicle with parts broken away for the purpose of illustrating details of the brake operating means, Fig. 2 is a cross sectional view taken substantially along the line 2—2 of Fig. 1, Fig. 3 is a view similar to that shown by Fig. 1, illustrating a front wheel brake of the vehicle, Fig. 4 is a cross sectional view taken substantially along the line 4—4 of Fig. 3.

Referring to Figs. 1 and 2, a rear wheel 10 is illustrated which is secured to an axle 11. A plate 12 forming a part of the brake drum assembly is rigidly associated with the wheel 10 and the axle 11 for rotation therewith and is provided at its outer periphery with an annular channel shaped brake drum element 13 having an inner axially extending braking surface 14 and an outer similar surface 15, both of which are within the channel. A pair of brake bands 16 and 17 are adapted to cooperate respectively with the surfaces 14 and 15 and as particularly shown by Fig. 2, each band is provided with a friction material 18 adjacent the braking surface with which it is adapted to cooperate. The ends of the bands 16 and 17 are connected to pins 20 and 21 respectively, that project into the channel 13 from a plate 22 having a cylindrical portion 26 journaled in a metal cover or backing plate 23. The latter is non-rotatably mounted on the axle housing 11', and extends radially beyond the open portion of the channel 13 and then in overlapping relation to the outer wall of the channel for the purpose of preventing dirt and other foreign matter from getting into the space between the brake bands and the braking surfaces 14 and 15.

Bolts 24 threaded into the cover 23 at diametrically opposite sides of a circular flange 27 on the plate 22, and washers 25 on the bolts, retain the plate in position but permit a rotary movement thereof when it is necessary to move the pins 20 and 21 and consequently the ends of the brake bands 16 and 17 for the purpose of adjustment of the brake bands to take up wear of the friction material 18, or for other purposes. Also, the plate 22 is provided with an arcuate portion 28 having a series of apertures 28' by means of which and a bolt 29, the position of the plate 22 on the cover 23 may be adjusted for the purpose of compensating for wear, etc.

The opposite ends of the bands 16 and 17 are looped about pins 30 and 31 which project from an arm 32 that is disposed transversely of the legs of the channel 13 adjacent their outer edges. Intermediately of its ends, the arm 32 is rigidly connected to a shaft 33 which is journaled in a housing 34 pivoted as indicated at 35 to the cover plate 23. The shaft 33 and a portion 36 of the housing 34 in which it is journaled, projects through a circular opening 37 in the cover plate 23 which permits an oscillatory movement of the housing 34 about the pivot 35 whenever necessary. The inner wall of the housing so engages the cover 23 that the opening 37 is closed to the outside, thereby preventing dirt and other foreign matter from getting into the working parts of the mechanism.

The outer end of the shaft 33 is connected to an operating arm 40 disposed in the housing 34, and which in turn, at its upper end, is connected to a wire or flexible cable 41, extending through an opening 42 in the housing 34 and to a brake pedal or other suitable operating lever. Preferably the cable 41 extends through a closely wound helical spring element 43, forming therewith a conventional "Bowden" wire arrangement. Spring means, not shown, constantly urge the brake elements toward their inoperative positions, with the upper end of the lever 40 at its extreme right hand position as viewed in Fig. 1.

The housing 34 is provided with a cover plate 44 which is secured thereto by means of machine bolts 45, and accordingly operating parts of the brake are readily accessible. The housing 34 may be removed from the plate 23 by removing the bolt 35, and the arm 40 from the shaft 33.

When it is desired to operate the brakes the cable 41 is pulled, moving the upper end of the arm 40 to the left, as viewed in Fig. 1, which causes the shaft 33 to rotate in a counterclockwise direction. This movement of the shaft 33 causes a movement of the pins 30 and 31 about the axis of the shaft 33 in a counter-clockwise direction as seen in Fig. 1, and tends to cause the brake band 16 to be contracted about the braking surface 14 and the brake band 17 to be expanded within the braking surface 15. If, however, one band should engage its braking surface prior to the time that the other band engages the other braking surface, a pivotal movement of the entire housing 34 will occur about the axis of the bolt 35 until both bands are forced against their corresponding braking surfaces with substantially the same pressure. For example, if the brake band 16 engages the braking surface 14 prior to the time that the brake band 17 engages the braking surface 15, then the housing 34 will turn counter-clockwise about the pivot 35, thereby moving the pin 30 until the brake band 17 engages the braking surface 14. In other words, as one brake band engages the braking surface it tends to force the housing 34 in a direction which will cause the other brake band to engage its braking surface with equal force.

It will be observed that one brake band will act as a full wrapping band when the wheel is turning in one direction, and the other will so act when the wheel is turning in the opposite direction. The internal expanding band 17 being of a more effective character and of larger diameter than the external contracting type 16, it is ordinarily preferable that the mechanism be so positioned that the band 17 act in its full wrapping capacity when the vehicle of which it forms a part is in forward movement, thus causing the inner band 16 to act in its full wrapping capacity when the vehicle is backing up. Thus extremely effective braking action is provided in either case.

The construction shown by Fig. 3 is substantially identical to that shown by Figs. 1 and 2 with the exception that the mechanism has been applied to the front wheel of a vehicle. The axle of the wheel is indicated at 50 and is provided with the ordinary spindle 51 on which the wheel 52 is journaled. However, in this construction, the housing 34 and associated parts of the brake operating means are located above the axle 50 whereas in the rear wheels shown by Fig. 1, these operating parts are disposed below the axle. This arrangement secures the same kind of movement of the arms 40 in both wheel brakes, which is necessary because the cables 41 will be pulled toward the driver's seat in the vehicle.

A brake mechanism constructed as above described is highly efficient in operation owing to the character of the mechanism provided and also to the fact that the operating parts of the mechanism are protected from dirt and other foreign matter which ordinarily get into the working parts of a brake. It will be apparent that the housing 34 in addition to protecting certain parts of the operating means as stated, also comprises an equalizing means for insuring equal application of both brake bands against the corresponding braking surfaces on the brake drums. The arrangement of parts in this construction is such, that they are readily accessible should for any reason any part fail to function properly. Commercial application of the brake mechanism indicates that it is one of the most efficient brakes yet devised for motor vehicles and that it consequently increases the safety with which motor vehicles may be operated.

Although only certain forms of the invention have been described and illustrated in detail, it will be apparent to those skilled in the art that various modifications may be made in the art without departing from the scope of the appended claims.

I claim:

1. A brake mechanism comprising a non-rotatable part and a rotatable part, a brake member on the rotatable part extending circumferentially thereof, a friction brake band extending about the periphery of the brake member and being secured at one end to the non-rotatable part, a housing pivoted to the non-rotatable part, an arm pivotally arranged in the housing, means extending through the housing and connecting the arm to the free end of the brake band, and means for connecting the arm to a brake pedal or the like.

2. A brake mechanism comprising a non-rotatable part and a rotatable part, a brake member on the rotatable part extending circumferentially thereof, a friction brake band extending about the periphery of the brake member and being secured at one end to the non-rotatable part, a housing pivoted to the non-rotatable part, an arm pivotally arranged in the housing, means extending through the housing and connecting the arm to the free end of the brake band, and means for connecting the arm to a brake pedal or the like, said last means being freely movable through an opening in the housing.

3. A brake mechanism comprising a non-rotatable part and a rotatable part, brake members on the rotatable part and extending circumferentially thereof in radially spaced relation, brake bands between the members and adapted to cooperate respectively with them, said bands at one end being connected to the non-rotatable part, a housing pivotally connected to the latter part adjacent the ends of the bands, a shaft extending through a wall of the housing and having arms on its exterior end connected to the free ends of the bands, an arm rigidly connected to the shaft and disposed in the housing, and operating means extending through the housing and connected to the free end of the lever.

4. A brake mechanism comprising a non-rotatable part and a rotatable part, a brake member on the rotatable part extending circumferentially thereof, a friction brake band extending about the periphery of the brake member and being secured at one end to the non-rotatable part, a housing pivoted to the non-rotatable part, an arm pivotally arranged in the housing, means extending through the housing and connecting the arm to the free end of the brake band, and means for connecting the arm to a brake pedal or the like, said housing being outside of the radial plane of the brake bands.

5. A brake mechanism comprising a rotatable brake member, a non-rotatable part, a brake band connected at one end to the non-rotatable part and adapted to engage the brake member, said non-rotatable part including housing means for preventing dirt from getting between the brake member and band, a housing pivoted to the non-rotatable part, and means within the pivoted housing and projecting to the exterior thereof for moving the brake band against the brake member, said housing being outside of the first mentioned housing means.

6. A brake mechanism comprising inner and outer rotatable concentric brake members, a non-rotatable part, brake bands extending circumferentially about the peripheral surfaces of the brake members respectively and being connected at one end to the non-rotatable part, an arm movably connected to the free ends of the bands, a housing pivoted to the non-rotatable part and housing the arm, and means within the housing extending to the exterior thereof and connected to the arm for moving it to cause engagement of the bands with the brake members, said housing being outside the plane of the marginal edges of the bands.

7. A brake mechanism for a motor vehicle wheel comprising inner and outer rotatable concentric brake members, brake bands adapted to engage the peripheral surfaces of the members respectively, one by contraction, the other by expansion, one end of each band being connected to a non-rotatable part on the wheel axle, operating means connected to the other ends of the bands, the arrangement being such that forward rotation of the wheel tends to expand the band operable by contraction, and a housing for parts of the operating means, pivoted to the non-rotatable part at a point radially spaced from the wheel axis.

8. A brake mechanism for a motor vehicle wheel comprising inner and outer rotatable concentric brake members, brake bands adapted to engage the peripheral surfaces of the members respectively, one by contraction, the other by expansion, one end of each band being connected to a non-rotatable part on the wheel axle, operating means connected to the other ends of the bands, the arrangement being such that forward rotation of the wheel tends to expand the band operable by contraction, and a housing for parts of the operating means, pivoted to the non-rotatable part at a point radially spaced from the wheel axis, said housing being located outside the radial plane of the bands.

9. A brake mechanism for a motor vehicle wheel comprising inner and outer rotatable concentric brake members, brake bands adapted to engage the peripheral surfaces of the members respectively, one by contraction, the other by expansion, one end of each band being connected to a non-rotatable part on the wheel axle, operating means connected to the other ends of the bands, the arrangement being such that forward rotation of the wheel tends to expand the band operable by contraction, said operating means comprising a device for equalizing the action of the bands, and a housing for parts of the operating means, pivoted to the non-rotatable part.

10. A brake mechanism for motor vehicle front wheels, comprising inner and outer concentric rotatable members, brake bands extending about the peripheral surfaces of the members and adapted respectively to engage the members, one of said bands being expansible, the other contractible, said bands being pivoted at one end to a non-rotatable part on the wheel axle, said pivot being above the axle, operating means for the bands and connected to their other ends, and a housing pivoted to the non-rotatable part and having operative connections to the bands, said housing being located above the wheel axle.

11. A brake mechanism comprising a rotatable brake member, a friction band connected at one end to a non-rotatable part and extending about the brake member, a housing pivotally connected to the non-rotatable part at a point offset with respect to the brake axis, and brake operating means in the housing and extending to the exterior thereof, said means being operatively connected to the free end of the band.

12. A brake mechanism comprising a rotatable brake member, a friction band connected at one end to a non-rotatable part and extending about the brake member, a housing pivotally connected to the non-rotatable part at a point offset with respect to the brake axis, and brake operating means in the housing and extending to the exterior thereof, said means being operatively connected to the free end of the band, said housing being located outside the plane of the band.

13. A brake mechanism comprising a rotatable drum, a non-rotatable member, a brake band connected at one end to the latter and extending circumferentially of the drum, an operating arm connected to the opposite end of the band, a housing for such arm, means for pivoting such housing on the non-rotatable member at a point spaced from the connection between the arm and the band, and operating means extending through the housing and connected to the free end of the arm.

14. A brake mechanism comprising a rotatable drum having radially spaced braking surfaces, a non-rotatable member, brake bands between such surfaces and connected at one end to the non-rotatable member, a link pivotally connecting the free ends of the bands, a housing pivoted to the non-rotatable member, an arm in the housing, and a pivotal means for the arm, journaled in the housing and connected to the link for turning the latter about the axis of the arm pivot without moving the housing about its pivot, said pivot for the housing being spaced from the pivot means for the arm, so as to permit turning of the link by the arm as well as bodily movement of the link and arm with the housing about the pivot for the latter.

15. A brake mechanism comprising a rotatable drum having radially spaced braking surfaces, a non-rotatable member, brake bands between such surfaces and connected at one end to the non-rotatable member, a link pivotally connecting the free ends of the bands, a housing pivoted to the non-rotatable member, an arm in the housing, and pivotal means for the arm, journaled in the housing and connected to the link for turning the latter about the axis of the arm pivot without moving the housing about its pivot, said pivot for the housing being spaced from the pivot means for the arm, so as to permit turning of the link by the arm as well as bodily movement of the link and arm with the housing about the pivot for the latter, the pivot for the housing being so located that upon pivotal movement of the latter, the pivot for the arm moves substantially in the line of continuation of the bands.

16. A brake mechanism comprising a rotatable drum, a non-rotatable member, a housing pivoted on the non-rotatable member, an arm in the housing, pivotal means on the arm pivotally passing through the housing, a brake band movably connected to the non-rotatable member for cooperation with the drum, means connecting the arm pivot means to a part of the band for operating it, and means extending into the housing and connected to the arm for moving the latter.

17. A brake mechanism comprising a rotatable drum, a non-rotatable member, a housing pivoted on the non-rotatable member, an arm in the housing, a pivot element on the arm pivotally passing through the housing, a brake band movably connected to the non-rotatable member for cooperation with the drum, means connecting the arm pivot to a part of the band for operating it, and means extending into the housing and connected to the arm for moving the latter, said pivot for the housing being spaced from the pivot for the arm.

18. A brake comprising a rotatable drum, a non-rotatable member, a movable brake band mounted on the latter and operating means for the band including a housing movably mounted on the non-rotatable member, and means operatively connecting the housing to the band.

19. A brake comprising a rotatable brake member, having radially spaced braking surfaces, a non-rotatable member, brake elements on said non-rotatable member for engaging said braking surfaces respectively, means for simultaneously moving the elements against such surfaces, and means for equalizing the application of said elements against the surfaces, including a housing pivoted on said non-rotatable member and housing part of the moving means.

20. A brake mechanism for a motor vehicle wheel comprising a rotatable member having a braking surface, a stationary member, a friction brake element adapted to cooperate with said braking surface, means for actuating said friction element including a pair of relatively and separately pivotal elements, a wire slidably passing through an opening in one element and connected to the other, and a flexible covering for the wire which is connected to the element through which the wire slidably passes.

21. A brake mechanism for a motor vehicle wheel comprising a rotatable member having spaced braking surfaces, a stationary member, friction elements adapted to engage said braking surfaces respectively, means for actuating said friction elements including a member pivotally mounted on the stationary member and a second member pivotally connected to the first pivotal member, a wire slidably connected to one pivotal member and slidably passing through an opening in the other pivotal member, and a flexible housing for the wire connected to the latter of said pivotal members.

WILLIAM A. BRUSH.